Jan. 3, 1950     A. S. VAN HALTEREN     2,493,173

BRAKE DRUM

Filed May 29, 1946

INVENTOR.
ANDREW S. VAN HALTEREN
BY

ATTORNEY

Patented Jan. 3, 1950

2,493,173

UNITED STATES PATENT OFFICE 2,493,173

BRAKE DRUM

Andrew S. Van Halteren, East Lansing, Mich., assignor to Motor Wheel Corporation, Lansing Mich., a corporation of Michigan Application May 29, 1946, Serial No. 672,978

4 Claims. (Cl. 188—218)

This invention relates to brake drums, and more particularly to brake drums for use with brake shoes of the internal expanding type.

Brake drums for use with brake shoes of the internal expanding type are usually made up of a braking ring and a support therefor. The latter may be the wheel itself, or a brake back or web attached to the wheel hub. The brake ring is firmly attached at one edge to the brake back or wheel itself, while the other edge of the ring is free.

Ordinary brakes of the character described are subject to a condition known as "bell mouthing." That condition is one in which the braking surface of the ring changes from a cylinder to a frusto-conical configuration, the larger circumference of which is at the free or open edge of the ring. "Bell mouthing" is particularly evident while the brake ring is hot. After a number of applications of the brake shoes, however, and the brake ring has been permitted to cool, the frusto-conical configuration will still be apparent, indicating that the brake ring takes a set in bell mouthed form and does not return to its original configuration.

The tapered, or bell mouthed, configuration of the braking ring is extremely undesirable, because it lessens the brake shoe contact area, and thereby necessitates greater braking effort. At the same time, it increases brake shoe and brake drum wear. Also, vibrations are inclined to be set up, causing objectionable noises.

I have discovered that bell mouthing can be minimized, if not entirely eliminated, by providing a limited amount of flexibility at the anchored edge of the braking ring. That flexibility is provided by means of an axial extension of the anchored edge of the brake ring shell, which is connected to the wheel or brake back. The extension may be integral with the shell, or it may be a separate ring connected to the brake ring proper. Preferably the extension is offset radially inwardly from the ring proper. The extension is thinner and considerably more flexible than the braking portion of the ring.

The extension thus provided permits the anchored edge of the braking portion of the brake ring to expand and contract during heating and cooling, and thereby minimizes the usual shrinkage at the anchored edge of the ring.

Figure 1:
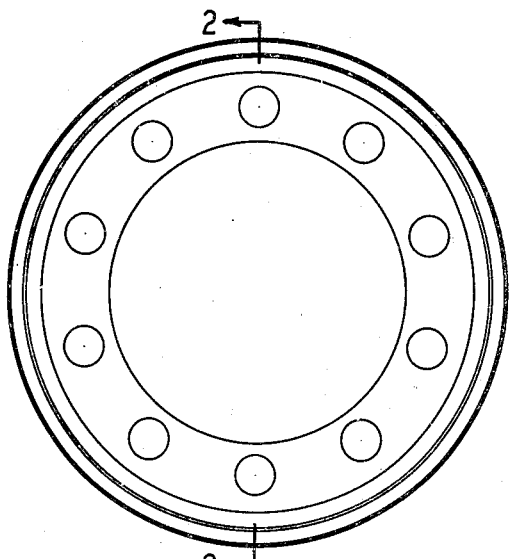
Figure 1 is an elevational view of a brake drum embodying the present invention.
Figure 2:
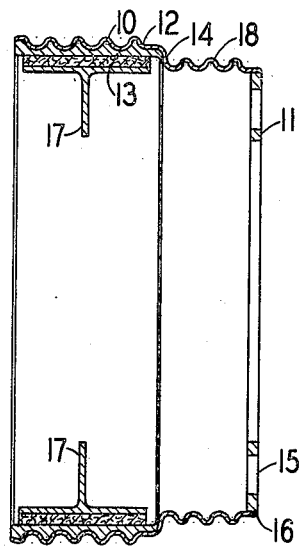
Figure 2 is a cross-sectional view taken on substantially the line 2—2 of Figure 1.

Figures 1 and 2 illustrate one form of the invention. Those figures illustrate a brake drum consisting of a brake ring 10 and a brake back 11.

The brake ring comprises an annular steel shell 12 having a lining 13 cast into one section to form the braking portion of the ring. The shell is preferably formed on a steel hoop and then rolled to the cross-sectional configuration shown. As viewed in Figure 2, it will be noted that the entire shell is provided with annular ribs, axially spaced apart. Also, somewhat less than one half of the axial extent of the ring adjacent the anchored edge thereof and forming the supporting portion 18 is of less diameter than the remainder of the ring, so as to provide a shoulder 14. The shoulder acts as a dam to limit the width of the lining when the latter is cast therein. In addition, the shoulder increases the desired flexibility of the ring.

The lining 13 is cast iron, centrifugally cast into the ring in a well known manner, and is then machined to form a smooth braking surface. As is shown in the drawings the lining materially increases the thickness of the braking portion of the ring as compared to the supporting portion 18. The composite thickness at the braking portion of the ring is preferably about one-half to three-quarters of an inch while the shell itself is formed from sheet steel having a thickness of about one-eighth inch.

The axial extremity of the supporting portion 18 of the ring is telescoped over the brake back 11 and is welded thereto, preferably by a continuous weld 16. The brake back is a steel plate provided with openings 15 to receive bolts by which the drum may be attached to a wheel hub (not shown).

The brake drum is employed in connection with conventional brake shoes 17 in the usual way. Application of the brake shoes to the braking portion of the brake ring when the latter is rotating generates considerable heat which causes the brake ring to expand. Expansion of the ring in the braking portion is quite uniform because of the flexibility of the supporting portion. The brake ring thus remains cylindrical, which is the result desired.

Figure 3:
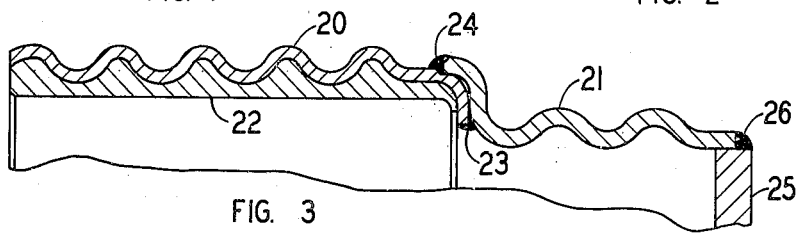
Figure 3 is a fragmentary cross-sectional view of a portion of a modified form of brake drum, on an enlarged scale.

The brake drum shown in Figure 3 is similar to Figures 1 and 2, but the shell of the brake ring is made up of two parts welded together instead of a single piece.

The brake drum comprises a brake ring shell composed of two rolled annular rings 20 and 21 of the cross-sectional configuration shown. The ring 20 forms the shell of the braking portion and is lined with cast iron 22. The two rings are overlapped as shown and are welded together by continuous welds 23 and 24. The ring 21 is welded at 26 to a brake back 25 similar to brake back 11.

From the foregoing it will be seen that the present invention is a substantial improvement over prior brake drums because it substantially eliminates the causes of "bell mouthing." It is simple, economical and relatively easy to manufacture. The scope of the invention is indicated in the appended claims.

I claim:

1. A brake drum including a brake ring comprising an annular braking section and an annular supporting section, said supporting section comprising a radial attaching flange spaced axially from said braking section and an axially extending substantially imperforate intermediate flange connecting said braking section and said radial flange and having a plurality of annular corrugations of equal diameter, said supporting section being of substantially less thickness than said braking section.

2. A brake drum including a brake ring comprising an annular braking section, a radial attaching flange at one axial extremity of said brake ring and spaced axially from said braking section, and an annualr intermediate portion connecting said braking section and said flange, said intermediate section being provided with a plurality of circumferentially continuous corrugations, said flange and intermediate portion being of less thickness and smaller diameter than said braking section.

3. A brake drum including a brake ring comprising an annular braking section, a radial attaching flange at one axial extremity of said ring and spaced axially from said braking section, and a relatively flexible intermediate portion having a plurality of equidiameter annular corrugations connecting said braking section and said flange, the diameter of said intermediate portion being less than that of the braking section.

4. A brake drum including a brake ring comprising a sheet metal shell having a radial attaching flange at one axial extremity, a lining receiving section spaced axially therefrom, and an annular intermediate portion connecting said flange and section, said intermediate portion being provided with a plurality of circumferentially continuous annular corrugations having equal diameters, said shell being of substantially uniform thickness, and a cast metal lining in said lining receiving section, said lining having a thickness sufficient to render said lining receiving section relatively rigid as compared to said annular portion.

ANDREW S. VAN HALTEREN.

REFERENCES CITED

The following references are of record in the file of this patent:

UNITED STATES PATENTS

| Number | Name | Date |
|---|---|---|
| 1,953,815 | Metzner | Apr. 3, 1934 |
| 1,974,662 | Lyman | Sept. 25, 1934 |
| 2,066,395 | Eksergian | Jan. 5, 1937 |
| 2,080,895 | Nelson | May 18, 1937 |

FOREIGN PATENTS

| Number | Country | Date |
|---|---|---|
| 394,307 | Great Britain | Sept. 17, 1931 |
| 831,661 | France | June 13, 1938 |